Patented Sept. 7, 1937

2,092,028

UNITED STATES PATENT OFFICE 2,092,028

SPIROCHETICIDE

Albert B. Scott and Oswald M. Gruhzit, Detroit, Mich., assignors to Parke, Davis & Company, Detroit, Mich., a corporation of Michigan No Drawing. Application July 5, 1932, Serial No. 620,975

9 Claims. (Cl. 167—69)

The invention relates to a new therapeutic agent useful particularly as a spirocheticide in the treatment of syphilis and other diseases caused by infection with spirochetes and trypanosomes.

Among the objects of the invention are the following:

First, to obtain a therapeutic product having spirochetocidal action and a high therapeutic ratio.

Second, to provide a product so potent that remarkably small doses may be used for curative effects.

Third, to provide a preparation that may be distributed in solid form as a stable substance.

Fourth, to provide a preparation that is readily water soluble.

Fifth, to provide a preparation that is readily administered by a physician without requiring neutralization or other manipulation other than the mere forming of a water solution.

These and other objects are obtained by the novel spirochetocidal preparation hereinafter described.

The invention contemplates an association of a plurality of substances, the principal ingredient of which is 3-amino-4-hydroxy-phenylarsine oxide. It has been discovered that this principal ingredient of our product, in spite of its high toxicity, possesses spirochetocidal activity out of proportion to its toxicity and the therapeutic ratio is superior to all of the well known arsenicals which are used clinically as spirocheticides. Among the advantages of 3-amino-4-hydroxy-phenylarsine oxide are the following:

First, only 60 milligrams of the substance is needed as a maximum dose in intravenous injection in contrast to a dose of 600 to 900 milligrams of arsphenamine for a corresponding treatment.

Second, the relatively small amount of the arsenical administered is advantageous because of the fact that a much smaller amount of metallic arsenic is thereby introduced with considerably less chance for arsenical side reactions.

Third, it is readily marketed as a stable product which can be administered directly by the mere formation of a water solution thereof.

The new therapeutic product may be prepared in various forms but preferably is in the form of finely powdered solid material comprising 3-amino-4-hydroxy phenylarsine oxide hydrochloride, sodium carbonate and sodium chloride. The amount of sodium carbonate used is that amount which will neutralize the HCl in the arsenical compound. The amount of sodium chloride used is preferably that amount which, together with the sodium chloride resulting from the neutralization, will dissolve in a predetermined amount of water to give a non-hemolytic solution. For example, a product containing 60 milligrams of the hydrochloride of 3-amino-4-hydroxy-phenylarsine oxide together with 13 milligrams sodium carbonate ($Na_2CO_3$), 60 milligrams sodium chloride (NaCl) when dissolved in 15 cc. of distilled water will form an isotonic solution containing 0.5% sodium chloride. This solution is adaptable for intravenous injection.

While our invention in its preferred form is represented by the specific formula given above, the invention in its broader aspects contemplates many other alternative products. Thus instead of the hydrochloride of 3-amino-4-hydroxy-phenylarsine oxide, other salts of the oxide may be used. Such salts include other halogenides such as bromides and iodides. They also include sulphates, acetates and, in fact, any salt of the oxide which may be pharmaceutically compounded with a neutralizing reagent to yield a mixture which when dissolved in water forms a solution containing 3 - amino - 4 - hydroxy - phenylarsine oxide. The hydrochloride is, however, by far the preferred reagent because it can be isolated most conveniently and further, because it reacts with sodium compounds with the formation of sodium chloride which in turn is desirable in the final solution.

In the broader phases of our invention the neutralizing agent may be other than the preferred compound, sodium carbonate. As examples of alternative reagents, the following are given:

Sodium bicarbonate ($NaHCO_3$)
Sodium hydroxide (NaOH)

In general any neutralizing agent may be provided if soluble salts are produced and no toxic reactions result from the neutralizing agent itself. Thus, the potassium salts are suitable chemically but are not as desirable as the sodium salts because of the toxic action on the heart when administered intravenously. Alkaline earth metal salts can also be used such as the calcium, strontium and magnesium salts, but barium is not desirable because of its toxicity. Thus our invention in its broader aspects comprises a large class of neutralizing agents but from a practical standpoint the other reagents within the scope of the invention have no advantage over the carbonate of sodium and this being readily available in pure form is preferable.

The principal therapeutic advantage of the neutralizing agent (Na2CO3) is that it causes the product to be less irritating than the acid hydrochloride itself. Neutralization results in a solution less painful on intravenous injection and the neutralized material is therefore a more suitable form in which to administer the drug. It is to be understood, however, that our invention may be embodied in products wherein the hydrochloride is only partially neutralized or, in some instances, even unneutralized. These modifications while much less desirable, are stable, water soluble products and when administered to laboratory animals give curative results also.

The 3-amino-4-hydroxy-phenylarsine oxide hydrochloride is commonly prepared in alcoholic solution and may be obtained with or without alcohol of crystallization. Either of these substances may be used in preparing the product forming the subject matter of our invention.

When our product is used intravenously it is desirable that a non-hemolytic solution be used and preferably therefore our powdered solid product has intimately incorporated therein the requisite amount of sodium chloride. It is to be understood, however, that our product may be marketed without the addition of the sodium chloride if so desired.

One of the novel features of our invention is the provision of an arsenical drug in such form that a substantially neutral non-hemolytic solution will be obtained by merely adding the powdered ingredients to distilled water. In the broader aspects of this phase of the invention, other arsenical drugs of acid character may be used in lieu of the hydrochloride of 3-amino-4-hydroxy-phenylarsine oxide.

From the foregoing it will be observed that our invention has made available for clinical use a new arsenical drug useful in the treatment of syphilis and superior to other arsenicals heretofore widely used for this purpose. The drug is obtainable in a pure state, is marketable in the form of a stable powdered solid, is simply and conveniently prepared for administration and is safe because no chemical manipulation is required at the time of administration.

While we have indicated certain preferred species of our invention, we do not limit ourselves to the specific details of our disclosure except as interpreted by the claims appended hereto.

What we claim as our invention is:

1. A spirocheticide comprising the hydrochloride of 3-amino-4-hydroxy-phenylarsine oxide pharmaceutically compounded with a sodium salt of carbonic acid to yield a mixture which when dissolved in water forms a solution containing

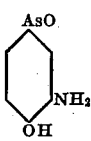

2. A spirocheticide comprising the hydrochloride of 3-amino-4-hydroxy-phenylarsine oxide pharmaceutically compounded with a sodium salt of carbonic acid and sodium chloride to yield a mixture which when dissolved in water forms a solution containing

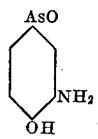

3. A spirocheticide comprising the hydrochloride of 3-amino-4-hydroxy-phenylarsine oxide pharmaceutically compounded with a sodium carbonate to yield a mixture which when dissolved in water forms a solution containing

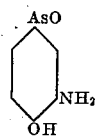

4. A spirocheticide comprising the hydrochloride of 3-amino-4-hydroxy-phenylarsine oxide pharmaceutically compounded with a sodium carbonate and sodium chloride to yield a mixture which when dissolved in water forms a solution containing

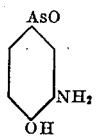

5. As a spirocheticide, a mixture comprising solid sodium carbonate and a solid acidic salt of 3-amino-4-hydroxy phenylarsine oxide capable of reacting with said sodium carbonate in water solution to form a solution of 3-amino-4-hydroxy-phenylarsine oxide.

6. A stable comminuted mixture of solid substances comprising comminuted hydrochloride of 3-amino-4-hydroxy-phenylarsine oxide and comminuted sodium carbonate and comminuted sodium chloride in the proportions of 60 milligrams of said hydrochloride, 13 milligrams sodium carbonate and 60 milligrams sodium chloride, said mixture being soluble in 15 cc. of distilled water to form an isotonic solution suitable for intravenous injection.

7. A drug for the treatment of human syphilis comprising solid hydrochloride of 3-amino-4-hydroxy-phenylarsine oxide and solid sodium carbonate in amount sufficient to neutralize said hydrochloride, said drug being in the form of a comminuted mixture of unreacted solid substances adapted when merely dissolved in water to form a solution suitable for intravenous injection.

8. A mixture comprising a solid acidic salt of 3-amino-4-hydroxy phenylarsine oxide and a solid non-toxic inorganic basic compound capable of reacting with said acidic salt in aqueous solution to form a therapeutically useful solution of 3-amino-4-hydroxy phenylarsine oxide.

9. A mixture comprising solid hydrochloride of 3-amino-4-hydroxy phenylarsine oxide and a solid non-toxic inorganic basic compound capable of reacting with said hydrochloride in aqueous solution to form a therapeutically useful solution of 3-amino-4-hydroxy phenylarsine oxide.

ALBERT B. SCOTT.
OSWALD M. GRUHZIT.